United States Patent [19]

Gilovich et al.

[11] 4,274,608
[45] Jun. 23, 1981

[54] TAPE TRANSPORT

[75] Inventors: Paul A. Gilovich, Saratoga; Thomas A. Hickox, San Jose, both of Calif.

[73] Assignee: Microcomputer Systems Corp., Sunnyvale, Calif.

[21] Appl. No.: 45,429

[22] Filed: Jun. 4, 1979

[51] Int. Cl.³ .................... G03B 1/04; G11B 15/32
[52] U.S. Cl. ........................... 242/192; 226/170
[58] Field of Search .............. 242/192, 197–200, 242/188, 92; 226/170–172; 360/96, 136, 132, 95; 227/46

[56] References Cited

U.S. PATENT DOCUMENTS

| 3,797,776 | 3/1974 | Umeda et al. | 242/188 |
| 4,054,923 | 10/1977 | Lewis | 360/60 |

*Primary Examiner*—Leonard D. Christian
*Attorney, Agent, or Firm*—Flehr, Hohbach, Test

[57] ABSTRACT

A tape transport for presenting tape from a replaceable tape roll to a rotating drum. The transport includes a belt for moving the tape between the tape roll and a take-up reel and maintaining the tape on the drum with uniform pressure.

4 Claims, 4 Drawing Figures

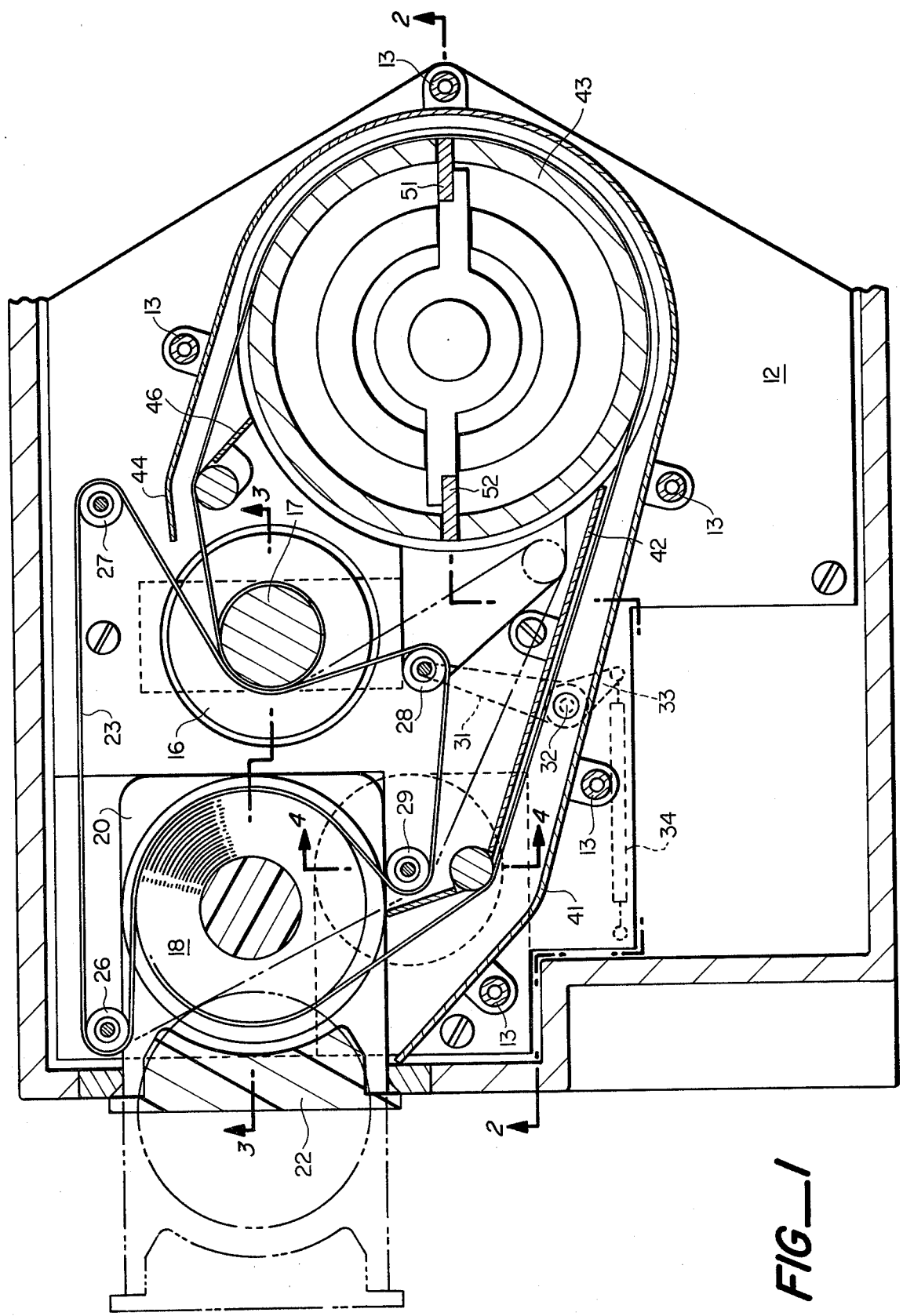
FIG_1

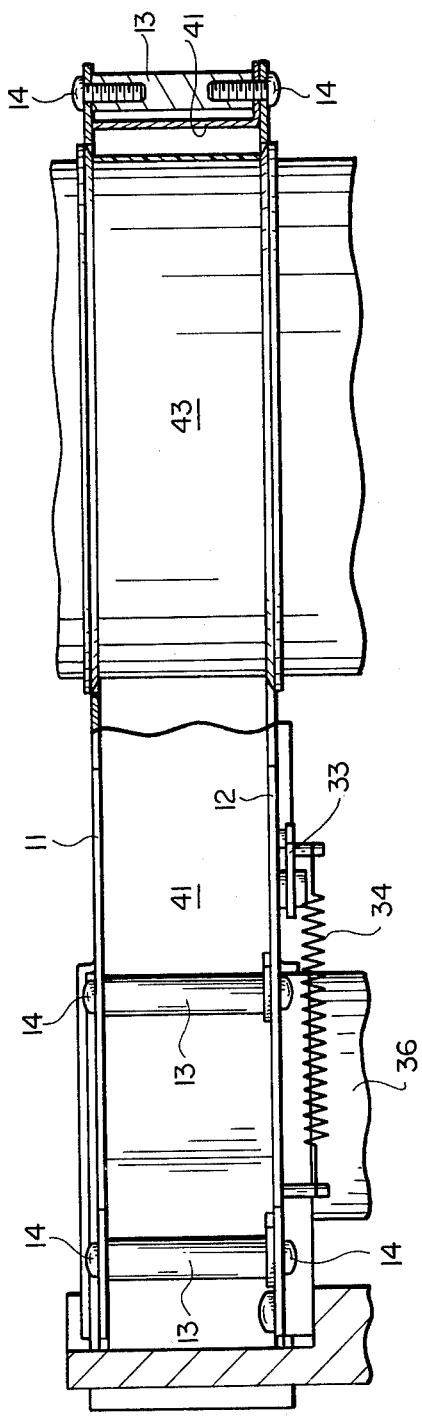
FIG_2
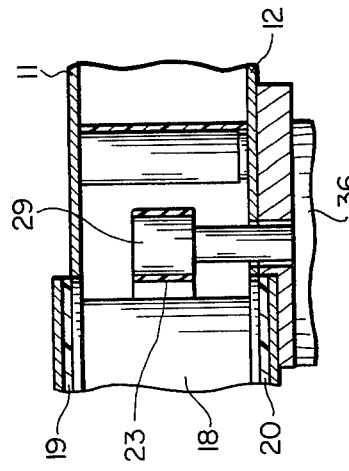
FIG_4
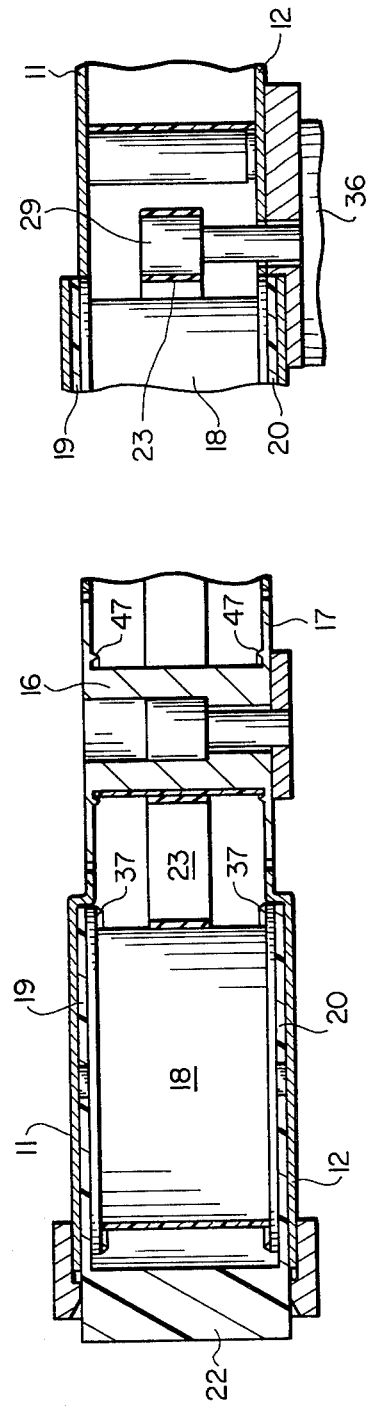
FIG_3

TAPE TRANSPORT

This invention relates generally to a tape transport for presenting tape from a replaceable tape reel to a rotary drum and a belt drive for advancing the tape.

Belt drive tape transports are shown and described in a number of prior art patents as, for example, U.S. Pat. Nos. 3,692,255 and 3,907,230. In each of these drives the supply and take-up reels are permanently mounted within a cartridge which is associated with the magnetic tape apparatus.

In U.S. Pat. Nos. 4,054,923 and 4,072,276, there is shown and described a belt driven tape transport with a removable tape roll whereby tape rolls can be inserted into the tape transport, the tape operated upon and rewound, and the tape roll removed for storage. In said apparatus the tape is self-threading whereby it is directed by the drive belt from the tape roll to a take-up reel past transducing heads.

The present tape transport is adapted to drive and present tape to a rotating drum of the type described in copending application Ser. No. 045,215, filed June 4, 1979, filed simultaneously herewith whereby sequential blocks of adjacent magnetic record tracks can be recorded or reproduced.

It is an object of the present invention to provide tape transport apparatus which is simple in construction.

It is another object of the present invention to provide a tape transport apparatus for presenting sequential lengths of magnetic tape to a rotatable drum.

It is another object of the present invention to provide a tape drive employing a spring-loaded continuous drive belt for driving the tape over the drum.

It is a further object of the present invention to provide a magnetic tape transport which is self-threading and which is adapted to receive removable tape rolls.

It is a further object of the present invention to provide a magnetic tape transport apparatus in which tape rolls contained in housings may be replaceably inserted into the tape transport for cooperation with an associated tape drum.

It is a further object of the invention to provide a tape drive for presenting tape to a rotating drum and maintaining predetermined tension in the tape.

The foregoing and other objects of the invention are achieved by a tape transport for presenting tape to a rotating drum which includes a take-up reel including a hub, a drive belt extending over spaced guide rollers with one of said guide rollers being spring-loaded to provide predetermined tension to said belt, a means for receiving a tape roll to bring the roll into engagement with said belt whereby when the belt is engaged, the spring-mounted roller is moved to tension the belt to engage the surfaces of the tape on the roll and the take-up reel hub and maintain the tape at predetermined tension, a drive means for engaging said belt and serving to drive the belt whereby it rotates and frictionally engages the tape to drive the tape from the supply roll over the magnetic drum and onto the take-up reel hub.

FIG. 1 is a plan view of tape transport apparatus in accordance with the present invention shown in cooperation with a magnetic tape drum.

FIG. 2 is a sectional view taken along the line 2—2 of FIG. 1.

FIG. 3 is a sectional view taken along the line 3—3 of FIG. 1.

FIG. 4 is a sectional view taken along the line 4—4 of FIG. 1.

Referring to the figures, the tape transport includes spaced top and bottom covers 11 and 12 which may be maintained in spaced relationship by means of spacer posts 13 to which the plates are secured by means of screws or other securing means 14. In FIG. 1 the tape transport is shown with the top cover removed. It is seen to include a take-up reel 16 including a hub 17 and a removable supply reel 18. The supply reel may be rotatably mounted in a cartridge containing upper and lower walls 19, 20 and end wall 22. The cartridge is inserted into the apparatus as shown in FIG. 1 and releasably held. The tape is then placed into engagement with the continuous drive belt 23. The drive belt extends between spaced rollers 26, 27 and 28 and drive roller 29. The roller 28 is mounted on the end of an arm 31 which is pivoted at 32 and includes a crank arm 33 engaged by a spring 34. The spring urges the arm in a clockwise direction to provide tension to the belt.

The drive pulley is driven by a motor 36 and as the belt is moved, it serves to feed tape between the supply roll and take-up reel. Initially, the belt engages and rotates the supply reel whereby a stiff tape leader is bent to disengage from the retaining beads 37 and extends outwardly from the coil. The leader engages the guide means formed by spaced walls 41 and 42 over the drum 43 of the type described in said copending application, past guide means 44 and 46, under the belt and onto the hub 17 of the take-up reel where the leader is forced under the beads 47 and wound onto the hub 17.

If the belt is substantially narrower than the tape, the forces of the belt may not snap the leader into engagement with the bead 37 during rewind and into engagement with the bead 47 during loading. In such circumstances spaced transverse stiffeners can be secured along the leader to minimize binding.

By energizing the motor associated with the drive roller, the tape is advanced over the drum which is rotated at high velocities. The belt maintains the tape at predetermined pressure. The drum provides an air cushion between the tape and drum as described in said copending application. The predetermined pressure maintains a relatively uniform cushion. The tape is advanced in incremental steps corresponding to blocks of data whereby the magnetic heads 51 and 52 are rotated to read or write longitudinal tracks and axially, in and out of the paper as shown in the figure, to write or read a plurality of spaced parallel longitudinal magnetic tracks on predetermined sections of tape corresponding to the section of the tape wound on the drum to form recording blocks. The tape is advanced by the drive roller 27 to present additional lengths of tape and form adjacent blocks.

It is seen that the tape transport is simple in construction and provides for the use of interchangeable tape rolls in a single recording apparatus. The rolls can then be stored and indexed. The tape is maintained at predetermined pressure on the drum. There is no need for uniform feed speed since the tape is stationary during recording and the heads are rotated at uniform speed.

What is claimed is:

1. A tape transport for presenting tape to a rotating drum comprising:
   a take-up reel including a hub,
   a drive pulley,
   at least three spaced guide rollers, a drive belt extending over spaced guide rollers and said drive pulley, spring-loaded means for mounting one of said spaced guide rollers adjacent one side of said take-up reel to move the roller in a direction to tension said belt, means for mounting another one of said spaced guide rollers on the other side of said take-up reel whereby the tensioned tape rides on said hub, means for receiving a tape supply roll to bring the roll into engagement with said belt whereby said belt is engaged and the roller is moved to accommodate the tape supply roll with the belt in engagement with the surface of said roll, a drive means for driving said drive pulley to drive the belt whereby to feed the tape from the tape supply roll over the tape drum and onto the hub under the belt, and means to guide the end of said tape as it travels from the supply roll over said tape drum and onto the take-up reel hub after the roll is initially inserted into said tape apparatus and the drive means is energized.

2. A tape transport as in claim 1 wherein said take-up reel includes beads adjacent said hub for receiving and retaining the end of the tape from the supply roll.

3. A tape transport as in claim 1 in which said spring loaded means includes a pivot, an arm extending from said pivot, means for rotatably mounting said one guide roller on said arm, a crank extending from said pivot for moving said arm and roller, and spring means engaging and rotating said crank about the pivot to move the one guide roller against the drive belt whereby the pressure between the drum and belt is maintained substantially uniform.

4. A tape transport as in claim 1 including a pair of spaced wall members for guiding said tape from said tape supply roller to said rotating drum, one of said wall members extending around said rotating drum to guide the tape over said drum and beyond the drum to guide the tape between the belt and the take-up reel hub.

* * * * *